US008292550B2

(12) United States Patent
Janson

(10) Patent No.: US 8,292,550 B2
(45) Date of Patent: Oct. 23, 2012

(54) BORING DEVICE

(75) Inventor: Jean-Philippe Janson, Le-Hamel-Bouzencourt (FR)

(73) Assignee: Airbus Operations SAS, Toulouse (FR)

( * ) Notice: Subject to any disclaimer, the term of this patent is extended or adjusted under 35 U.S.C. 154(b) by 1036 days.

(21) Appl. No.: 12/066,766

(22) PCT Filed: Sep. 11, 2006

(86) PCT No.: PCT/FR2006/002079
§ 371 (c)(1),
(2), (4) Date: Sep. 24, 2008

(87) PCT Pub. No.: WO2007/031631
PCT Pub. Date: Mar. 22, 2007

(65) Prior Publication Data
US 2009/0311059 A1 Dec. 17, 2009

(30) Foreign Application Priority Data
Sep. 14, 2005 (FR) ...................... 05 09391

(51) Int. Cl.
*B23B 39/10* (2006.01)
*B23B 47/14* (2006.01)
*B23B 47/18* (2006.01)

(52) U.S. Cl. ............................ 408/17; 408/137; 408/138

(58) Field of Classification Search .................... 408/17, 408/126, 137, 138, 141; *B23B 39/10, 47/14, B23B 47/18*
See application file for complete search history.

(56) References Cited

U.S. PATENT DOCUMENTS

| 3,679,320 | A | * | 7/1972 | Bohorquez et al. ............. 408/99 |
| 4,123,187 | A | * | 10/1978 | Turner ............................. 408/17 |
| 4,182,588 | A | | 1/1980 | Burkart et al. |
| 4,201,271 | A | * | 5/1980 | Evans ............................. 173/146 |
| 4,591,299 | A | * | 5/1986 | Eckman ........................ 408/1 R |
| 4,592,681 | A | * | 6/1986 | Pennison et al. ................ 408/10 |
| 4,681,490 | A | * | 7/1987 | Pennison et al. ................ 408/10 |
| 4,688,970 | A | * | 8/1987 | Eckman .......................... 408/9 |
| 4,813,822 | A | * | 3/1989 | Biek .............................. 408/14 |
| 5,022,800 | A | * | 6/1991 | Vindez ........................... 408/14 |
| 5,342,152 | A | | 8/1994 | Medeksza |
| 5,351,797 | A | * | 10/1994 | Lawson et al. ................ 192/141 |
| 6,231,278 | B1 | * | 5/2001 | Gehlsen ....................... 408/1 R |
| 2001/0020808 | A1 | | 9/2001 | Suzuki et al. |
| 2005/0025589 | A1 | * | 2/2005 | Murai et al. .................... 408/138 |
| 2009/0074525 | A1 | * | 3/2009 | Jaillon ............................ 408/132 |

FOREIGN PATENT DOCUMENTS

| DE | 24 36 340 | | 3/1975 |
| DE | 197 18 275 | | 11/1998 |
| DE | 101 09 990 | | 9/2002 |
| EP | 1 500 780 | | 1/2005 |
| GB | 2248566 | A * | 4/1992 |

* cited by examiner

*Primary Examiner* — Eric A Gates
(74) *Attorney, Agent, or Firm* — Oblon, Spivak, McClelland, Maier & Neustadt, L.L.P.

(57) ABSTRACT

The invention concerns a perforating device comprising a cutting tool (10), means for rotating (11) the cutting tool (10) and means for translating (12, 14) the cutting tool (10), the ratio between the rotational speed and the translational speed being variable during rotation of the cutting tool (10). It comprises a gear train (16, 17; 18, 19) for synchronizing the rotating means (11) with the translating means (12, 14). The speed ratio between a driving pinion (16; 18) of the gear train, rotationally linked to the means (11) for rotating the cutting tool (10) and a transmission pinion (17; 19) of the translating means is reversed at least once during one rotation of the cutting tool (10). The invention is useful for fragmenting the resulting shavings.

14 Claims, 2 Drawing Sheets

BORING DEVICE

BACKGROUND

The present invention concerns a perforation device.

The present invention relates generally to the field of perforation, including in particular the techniques of perforation, but also the techniques of milling.

Generally speaking, the present invention concerns a perforation device, comprising a rotating cutting tool, such as a drill.

In this type of perforation technique, the quality of the result obtained depends on many parameters and especially the proper removal of the chips formed during the perforation. In fact, if this removal is not effective and some of the chips remain in place, they may then become entrained by rotation of the cutting tool and thereby degrade the geometry or the surface condition of the hole produced.

In particular, when a perforation device comprises a cutting tool driven by a part in rotation and another part in translation, the regular feed of the cutting tool in the course of the perforation process has the effect of producing long chips which are difficult to remove.

Document U.S. Pat. No. 5,342,152 describes a device comprising a cutting tool driven in rotation and in translation and subjected to an oscillation along the axis of rotation, allowing one to vary the thickness of the chips and to cut these chips.

The ratio between the speed of translation and the speed of rotation of the cutting tool is variable during the rotation of said cutting tool.

Thus, by modifying the ratio between the speed of translation and the speed of rotation during the rotation of the tool, the thickness of the chips formed is modulated in such a way that the resulting chip becomes fragile.

These irregular chips are thus more easy to remove, especially by breaking up these chips.

BRIEF SUMMARY

The purpose of the present invention is to propose a perforation device making it possible to ensure a satisfactory removal of the chips by using precise and reliable means.

For this purpose, the present invention contemplates a perforation device having a cutting tool, means of driving this cutting tool in rotation and means of driving the same cutting tool in translation, the ratio between the speed of rotation and the speed of translation being variable during the rotation of the cutting tool.

According to the invention, the perforation device has a gear train adapted to synchronize the means for driving in rotation with the means for driving in translation, the speed ratio between one driving pinion of the gear train connected in rotation to the means for driving the cutting tool in rotation and one transmission pinion of the means for driving in translation being inverted at least once during one rotation of the cutting tool.

By intervening directly at the pinions of a gear train of the tool, it is possible to modify and periodically cancel the speed of translation of the cutting tool.

According to one characteristic of the invention, the speed of rotation or the speed of translation of the cutting tool is variable for not more than one rotation of the cutting tool.

One thus avoids the formation of helical chips, which are harder to remove.

In practice, the speed of translation of the cutting tool is zero at least once during a rotation of the cutting tool.

The chip thus formed during the feed of the tool is broken up during the rotation of the tool, thanks to the feed of the cutting tool in consecutive stages.

The pieces of chip of short length are thus more easily removed.

In practice, the means for driving in translation comprise a threaded spindle, joined in rotation to the means for driving the cutting tool in rotation and a tapped pinion mounted on the threaded spindle, the speed ratio between an input pinion joined to the threaded spindle and the tapped pinion being inverted at least once during one rotation of the input pinion.

BRIEF DESCRIPTION OF THE DRAWINGS

Other features and benefits of the invention will appear more clearly in the following description.

In the enclosed drawings, given as nonlimiting examples.

DETAILED DESCRIPTION

Figure 1:
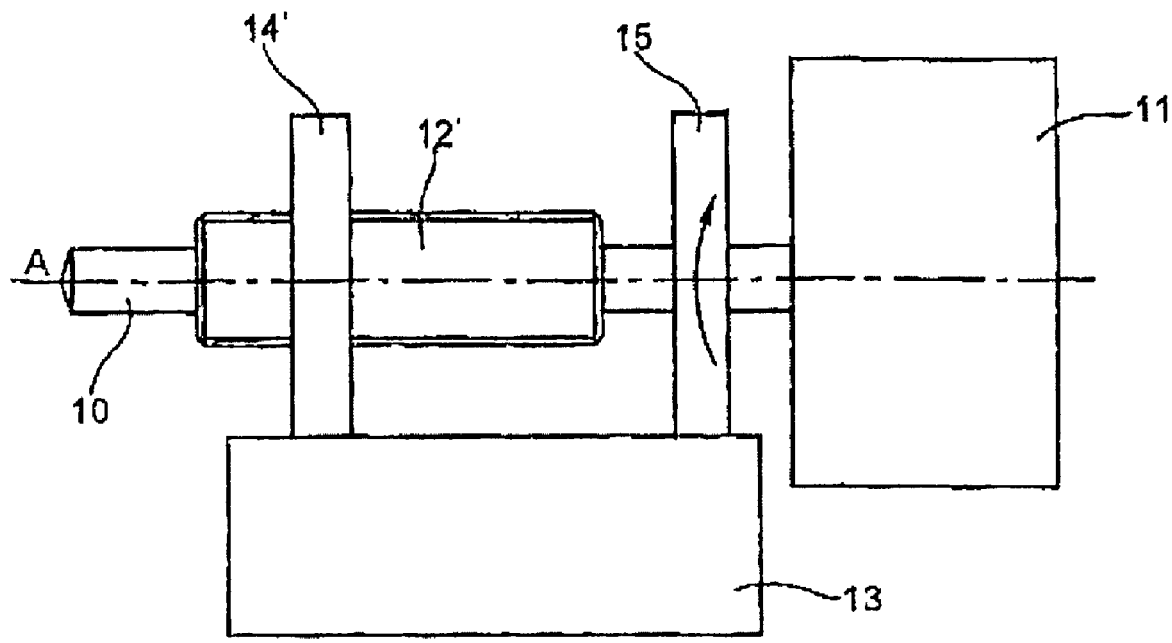
FIG. 1 is a schematic view illustrating a perforation device according to one embodiment of the invention.

We shall now describe a perforation device according to one embodiment of the invention, making reference to FIG. 1.

The perforation device comprises a rotating tool 10, such as a drill, or a milling cutter, adapted to perform a perforation or a milling in a metal sheet.

The cutting tool 10 is mounted in rotation about an axis A.

For this purpose, the perforation device has a motor 11, adapted to drive the cutting tool 10 in rotation about the axis A.

A threaded spindle 12 is mounted in joint rotation on the axis of rotation A. The motor 11 thus drives the cutting tool 10 and the threaded spindle 12 in rotation at the same time.

The cutting tool 10 is likewise adapted to move in translation. For this purpose, a transmission box 13 in this embodiment makes it possible to transmit the rotational movement at the exit of the motor 11 to a tapped pinion 14 mounted on the threaded spindle 12.

This tapped pinion 14 is locked in translation with respect to the axis A, such that the relative rotation of the tapped pinion 14 and the threaded spindle 12 makes it possible for this threaded spindle 12 to move in translation along the axis A.

In this respect, in order to produce a feed motion of the cutting tool 10, it is necessary for the threaded spindle 12 and the tapped pinion 14 to turn at different speeds.

As a nonlimiting example, if the threaded spindle 12 and the tapped pinion 14 each have a right thread pitch of 1 mm, and if the threaded spindle 12 is driven in rotation to the right, at a speed of 1000 rpm, and the tapped pinion 14 is likewise driven in rotation via the transmission box 13 at a rotational speed of 900 rpm, the threaded spindle will move along axis A by an amount equal to 100 times the thread pitch of 1 mm, that is, at a speed of 100 mm/min.

This speed of translation corresponds to a feed of the cutting tool 10 of 0.1 mm per rotation.

If this transmission speed of the cutting tool 10 is regular during the rotation of the tool, the chips formed are of regular thickness and great length, so that they are hard to remove.

To remedy this drawback, the invention modifies the speed of translation, or rather the speed of rotation of the cutting tool 10 during the rotation of this tool 10, so as to form irregular chips, more easy to remove.

In this embodiment, the speed of translation of the cutting tool, that is, of the threaded spindle 12 along the axis A, is modified thanks to a modification in the region of the transmission box 13.

In practice, the transmission box makes it possible to transmit the movement of rotation at the exit from the motor 11, in the region of an input pinion 15, to the tapped pinion 14 so as to allow for governing the speed of rotation of the tapped pinion 14 with respect to the speed of rotation of the threaded spindle 12.

Figure 2:
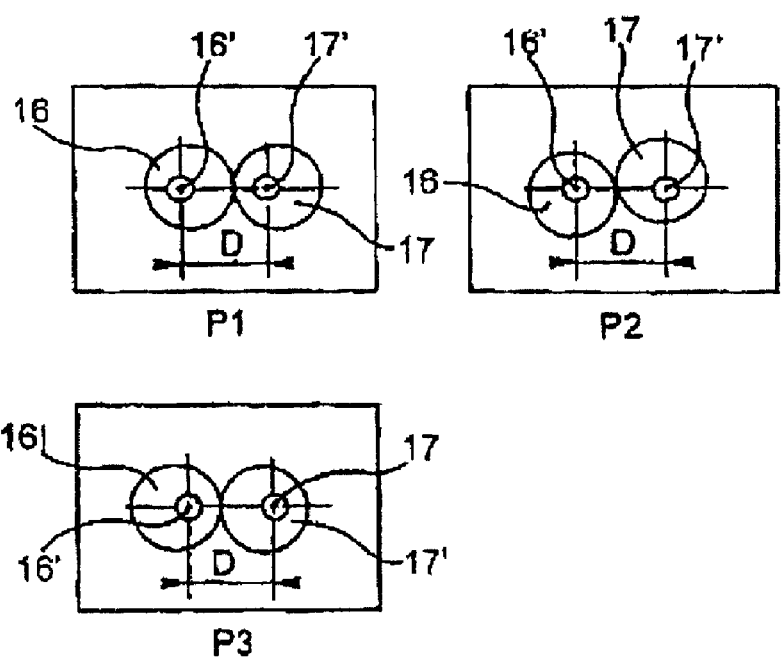
FIG. 2 is a schematic view in three consecutive positions of a gear train implemented in the perforation device of FIG. 1, according to a first embodiment.

A gear train such as that illustrated, for example, in FIG. 2, can be provided in the region of the transmission box 13 to synchronize the movement of the input pinion 15 with the rotational movement of the tapped pinion 14.

In this embodiment, as illustrated in FIG. 2, the gear train comprises two pinions 16, 17. These pinions 16, 17, for example, can be of identical diameter and have at their periphery a series of teeth distributed regularly over the periphery of each pinion 16, 17.

The input pinion 15 meshes, for example, with a driving pinion 16, which drives the pinion 17, and the latter transmits via one or more transmission gear wheels its movement to the tapped pinion 14.

These pinions 16, 17 are mounted in an off-center manner with respect to their respective axis of rotation 16', 17'. They are off center by the same amount relative to their axis of rotation 16', 17', and the distance D between the axes of rotation 16', 17' is constant during the rotation of the pinions 16, 17.

Thus, considering, for example, pinion 16 to be a driving pinion, the speed of rotation in the region of the axis 17' of the driven pinion 17 will varies during one rotation of the driving pinion 16.

Figure 3:
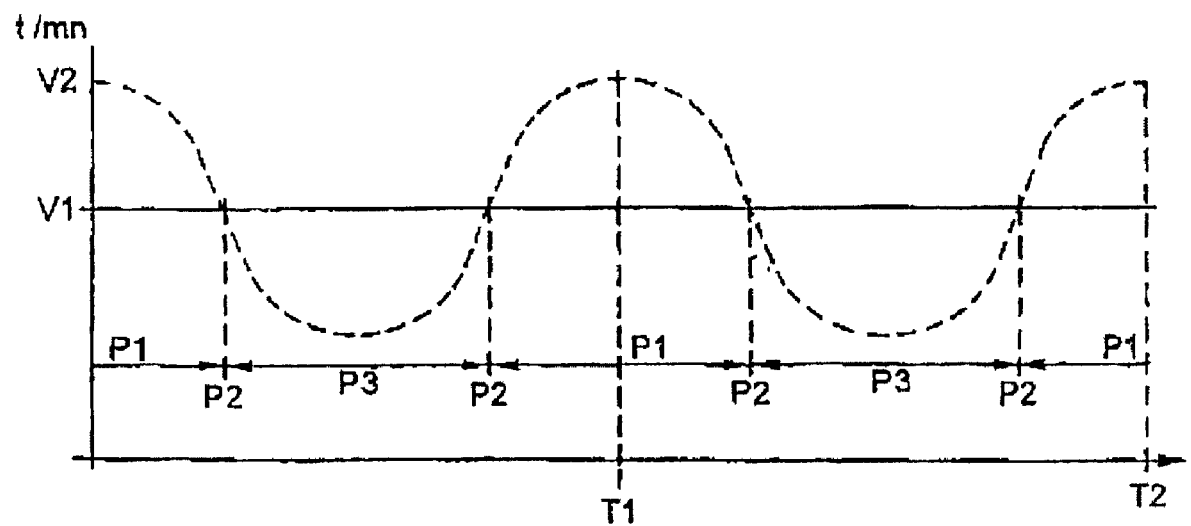
FIG. 3 is a curve illustrating the relative speed of the pinions of the gear train of FIG. 2.

As is well illustrated in FIG. 3, in a first position P1 the speed V2 of the driven pinion 17 is greater than the speed V1 of the driving pinion 16. This speed V2 of the pinion 17 decreases to become equal to the speed V1 of the driving pinion 16 when the pinions 16, 17 are at the position P2, that is, when their point of meshing is at an equal distance of the axes of rotation 16', 17' of the pinions 16, 17.

Then, in position P3, the speed V2 of the driven pinion 17 is less than the speed V1 of the driving pinion 16 until the two pinions are again at position P2.

Thus, when such a gear train is placed in the region of the transmission box 13 between the input pinion 15 and the tapped pinion 14, the speed ratio between the driving pinion 15 connected to the threaded spindle 12 and the tapped pinion 14 is inverted at least once, and in this case twice, during the rotation of the input pinion 15.

In practice, when the speeds V1, V2 are identical, in position P2 of the pinions 16, 17, the rotational speed of the threaded spindle 12 and the tapped pinion 14 are identical, so that the translatory speed along axis A of the threaded spindle 12 and, consequently, of the cutting tool 10, is zero.

Depending on the type of mounting of the tapped pinion 14 on the threaded spindle 12, the direction of translation can be inverted during each rotation of the cutting tool 10.

As a nonlimiting example, the cutting tool 10 can pull back by 0.10 mm and advance by 0.15 mm in each rotation.

By thus canceling at least once the speed of translation of the cutting tool 10 during one rotation of this cutting tool, it is possible to break up the resulting chips, which facilitates their removal.

Of course, the embodiment in the region of the gear train of the transmission box 13, making it possible to modify the speed of translation of the cutting tool 10 during its rotation, is in no way limiting.

Figure 4A:
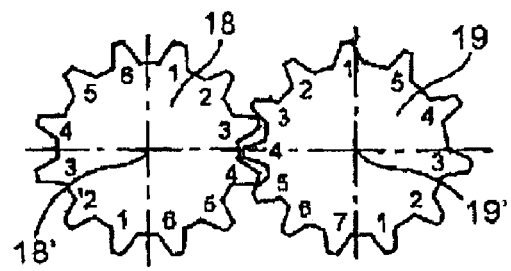
FIGS. 4A and 4B are schematic views in two positions of a gear train implemented in the perforation device of FIG. 1, according to a second embodiment of the invention.
Figure 4B:
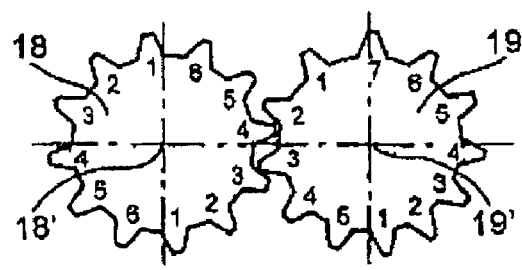

A second embodiment also making it possible to modify the speed of translation of the cutting tool 10 has been illustrated in FIGS. 4A and 4B.

As is illustrated in FIGS. 4A and 4B, the gear train comprises two pinions 18, 19 of identical diameter. One of the pinions, here the driven pinion 19, has an evolutory modulus, that is, it has teeth arranged at irregular intervals on its periphery.

In this embodiment, the first pinion 18 has a predetermined number of teeth, here equal to twelve, distributed at a regular pitch on its periphery. The second pinion 19 has the same number of teeth, but distributed at an irregular pitch on its periphery. In this embodiment, five teeth are distributed along half the periphery of the second pinion 19 and seven teeth are distributed along the other half of the periphery of the second pinion 19.

Of course, this irregular distribution of the teeth on this second pinion 19 could be different, as long as the driving of this second pinion 19 by the first pinion 18 remains possible.

Thus, in the position as illustrated in FIG. 4A, when the first pinion 18 is driven in rotation, the speed in the region of the axis 19' of the second pinion 19 is greater than the speed of rotation in the region of the axis 18' of the first driving pinion 18.

By the same token, in the position illustrated in FIG. 4B, the output speed of rotation of the axis 19' of the second pinion 19 is less than the speed of rotation in the region of the axis 18' of the first pinion 18.

This gear train arranged in the region of the transmission of a device as illustrated in FIG. 1 also makes it possible to cancel the speed of translation of the cutting tool 10 at least once, in this case twice, during the rotation of the cutting tool 10.

Of course, the present invention is in no way limited to the embodiments described above and many modifications can be made to these embodiment examples without departing from the context of the invention.

In particular, other types of gear train can be used, for example, pinions of complex shape, such as oval or potato-shaped.

Likewise, the embodiment illustrated in FIG. 1 is not limiting: other types of means for driving the cutting tool in translation can be used, for example, a mounting on a carriage, mounted in translation, for the assemblage of the tool and these means of rotation.

It thus is possible by acting on the means for driving the carriage in translation to modify the speed of translation of the cutting tool during one rotation of this tool.

Furthermore, the speed of translation of the cutting tool can remain constant, only the speed of rotation varying during the rotation of the cutting tool.

The invention claimed is:

1. A perforation device, comprising:
   a cutting tool,
   a threaded spindle mounted on the cutting tool,
   means for driving said cutting tool and said threaded spindle in joint rotation around an axis,
   means for driving said cutting tool and said threaded spindle in joint translation along the axis, including a tapped pinion mounted on the threaded spindle and locked in translation with respect to the axis such that the relative motion of the tapped pinion to the threaded spindle moves the spindle and the cutting tool in translation along the axis, and a gear train including a driving pinion and a transmission pinion adapted to synchronize said means for driving in rotation with said means for driving in translation, wherein a speed ratio between the driving pinion of said gear train connected in rotation to said means for driving in rotation and the transmission pinion of the means for driving in translation is inverted at least once during one rotation of said cutting tool, and wherein ratio between a speed of rotation and a speed of translation is variable during the rotation of the cutting tool.

2. The perforation device according to claim 1, wherein the speed of rotation of said cutting tool is variable for not more than one rotation of the cutting tool.

3. The perforation device according to one of claim 1 or 2, wherein the speed of translation of said cutting tool is variable for not more than one rotation of said cutting tool.

4. The perforation device according to claim 3, wherein the speed of translation of said cutting tool is zero at least once during one rotation of said cutting tool.

5. The perforation device according to claim 1, further comprising an input pinion to transmit movement of rotation from the driving means to the gear train, wherein a speed ratio between the input pinion and the tapped pinion is inverted at least once during one rotation of said input pinion.

6. The perforation device according to claim 1, wherein the driving pinion and the transmission pinion have an identical diameter, an axis of rotation of the driving pinion is off-set from a center of the driving pinion, an axis of rotation of the transmission pinion is off-set from a center of the transmission pinion, and a distance (D) between said axis of rotation of the driving pinion and the axis of rotation of the transmission pinion being constant during rotation of said pinions.

7. The perforation device according to claim 1, wherein the driving pinion and the transmission pinion have an identical diameter, the driving pinion includes a predetermined number of teeth distributed at a regular pitch, and the transmission pinion includes the same predetermined number of teeth distributed at an irregular pitch.

8. A perforation device, comprising:
a cutting tool,
a threaded spindle mounted on the cutting tool,
a motor to drive said cutting tool and said threaded spindle in joint rotation around an axis,
a tapped pinion to drive said cutting tool and said threaded spindle in joint translation along the axis, and the tapped pinion is mounted on the threaded spindle and locked in translation with respect to the axis such that relative motion of the tapped pinion to the threaded spindle moves the spindle and the cutting tool in translation along the axis, and a gear train including a driving pinion and a transmission pinion adapted to synchronize said rotation of the cutting tool with said translation of the cutting tool, wherein a speed ratio between the driving pinion of said gear train connected in rotation to said motor and the transmission pinion connected to said tapped pinion is inverted at least once during one rotation of said cutting tool, and wherein a ratio between a speed of rotation and a speed of translation is variable during the rotation of the cutting tool.

9. The perforation device according to claim 8, wherein the speed of rotation of said cutting tool is variable for not more than one rotation of the cutting tool.

10. The perforation device according to claim 8, wherein the speed of translation of said cutting tool is variable for not more than one rotation of said cutting tool.

11. The perforation device according to claim 10, wherein the speed of translation of said cutting tool is zero at least once during one rotation of said cutting tool.

12. The perforation device according to claim 8, further comprising an input pinion to transmit movement of rotation from the motor to the gear train, wherein a speed ratio between the input pinion and the tapped pinion is inverted at least once during one rotation of said input pinion.

13. The perforation device according to claim 8, wherein the driving pinion and the transmission pinion have an identical diameter, an axis of rotation of the driving pinion is off-set from a center of the driving pinion, an axis of rotation of the transmission pinion is off-set from a center of the transmission pinion, and a distance (D) between said axis of rotation of the driving pinion and the axis of rotation of the transmission pinion being constant during rotation of said pinions.

14. The perforation device according to claim 8, wherein the driving pinion and the transmission pinion have an identical diameter, the driving pinion includes a predetermined number of teeth distributed at a regular pitch, and the transmission pinion includes the same predetermined number of teeth distributed at an irregular pitch.

* * * * *